United States Patent [19]

Dallmer

[11] Patent Number: 5,148,872
[45] Date of Patent: Sep. 22, 1992

[54] HORSEHOOF BOOT WITH HORSESHOE

[76] Inventor: Helmuth Dallmer, Alte Landstrasse 3, 2125 Salzhausen-Putensen, Fed. Rep. of Germany

[21] Appl. No.: 654,777

[22] Filed: Feb. 13, 1991

[30] Foreign Application Priority Data

Feb. 21, 1990 [DE] Fed. Rep. of Germany ....... 4005388

[51] Int. Cl.⁵ .......................... A01L 3/00; A01L 5/00
[52] U.S. Cl. ........................................ 168/11; 168/20
[58] Field of Search ............... 168/11, 18, 20, DIG. 1

[56] References Cited

U.S. PATENT DOCUMENTS

| | | | |
|---|---|---|---|
| 44,522 | 10/1864 | Forker | 168/20 |
| 220,937 | 10/1879 | Meier | 168/20 |
| 1,280,791 | 10/1918 | McMullen | 168/11 |
| 3,630,289 | 12/1971 | Norberg | 168/12 X |
| 4,265,314 | 5/1981 | Tovim | 168/4 |
| 4,892,150 | 1/1990 | Thoman | 168/20 X |

*Primary Examiner*—Robert P. Swiatek
*Attorney, Agent, or Firm*—Henry M. Feiereisen

[57] ABSTRACT

A hoof boot includes a massive base for attachment of a horseshoe and a collar which is connected to the base and is glued laterally to the hoof of a horse via a textile covering lined inwardly of the collar. The base and the collar are made in form of molded part of plastic material. The collar is provided with several thin strips which serve as predetermined breaking points so as to divide the collar in several sections and to allow adjustment thereof to the configuration of the horse hoof. The attachment of the horseshoe to the base is accomplished with nails, split rivets or wood screws in such a manner that the horseshoe can be detached without removing the molded part which is glued to the horsehoof.

5 Claims, 2 Drawing Sheets

HORSEHOOF BOOT WITH HORSESHOE

BACKGROUND OF THE INVENTION

The present invention refers to a horsehoof boot with horseshoe, and in particular to a horsehoof boot of the type being a plastic part which includes a collar for attachment to the hoof of a horse and a base connected to the collar and adapted for attachment of a horseshoe.

A horsehoof boot of this type is known from the German publication DE-OS 32 23 187 which describes knobs mounted to the underside of the base. These knobs are provided with suitable pocket holes for receiving connecting screws for mounting the horseshoe to the base. This publication fails to make any mentioning of the type of screws and their arrangement.

SUMMARY OF THE INVENTION

It is an object of the present invention to provide an improved horsehoof boot which allows a variety of detachable connections between the hoof boot and the horseshoe.

This object and others which will become apparent hereinafter are attained in accordance with the present invention by a plastic part which includes a base with a continuous flat surface adapted for attachment of a horseshoe and a collar connected to the base and adapted for gluing to a horsehoof, and by fasteners in form of split rivets, nails or wood screws by which the horseshoe is detachably connectable to the base without requiring removal of the plastic part.

Through the provision of such fasteners, conventional horseshoes with holes for receiving hoofnails, which are arranged and connected in a crease, are usable so that the utilization of special types of horseshoes becomes unnecessary. The conventional horseshoe can be nailed or riveted to the hoof boot or be attached by wood screws. In each embodiment, the horseshoe can be detached without requiring removal of the plastic part which is glued to the horsehoof. The secure connection between the plastic part and the horseshoe is ensured, thus enabling to substitute horseshoes used for daily need by special race horseshoes.

According to one embodiment of the invention, the horseshoe may be connected to the base by means of split rivets which have a flat head bearing upon the base and a rivet shaft traversing the aligned holes of horseshoe and base, with their split ends being spread in the area of the crease.

In the event nails are used as fasteners, the head of the nails is received in the crease while the shaft arches through the aligned holes of base and horseshoe and is arched outwardly to penetrate the apex of the base and the collar.

In another embodiment, wood screws are used for providing the detachable connection between the horseshoe and the base with the head of the wood screws being received in a widening of the crease.

In all embodiments, the collar has a rim from which thin strips extend downwardly for defining predetermined breaking points so as to allow a tearing or ripping of the collar wall, A division of the collar in several sections enables the hoof boot to be adapted to the outer wall surface of the horsehoof so as to provide a continuous flat contact surface between the hoof boot and the horsehoof.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
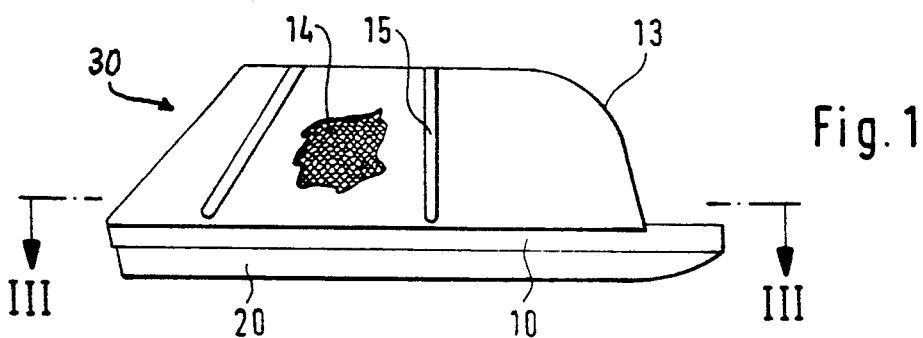
FIG. 1 is a side elevational view of an embodiment of a horsehoof boot in accordance with the invention, with a horseshoe mounted thereto.
Figure 2:
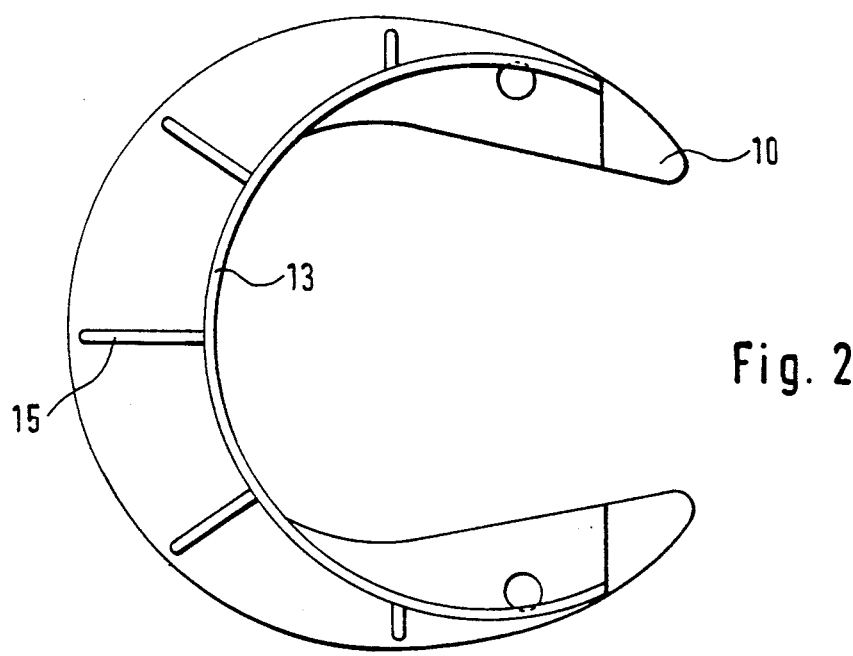
FIG. 2 is a top plan view thereof.
Figure 3:
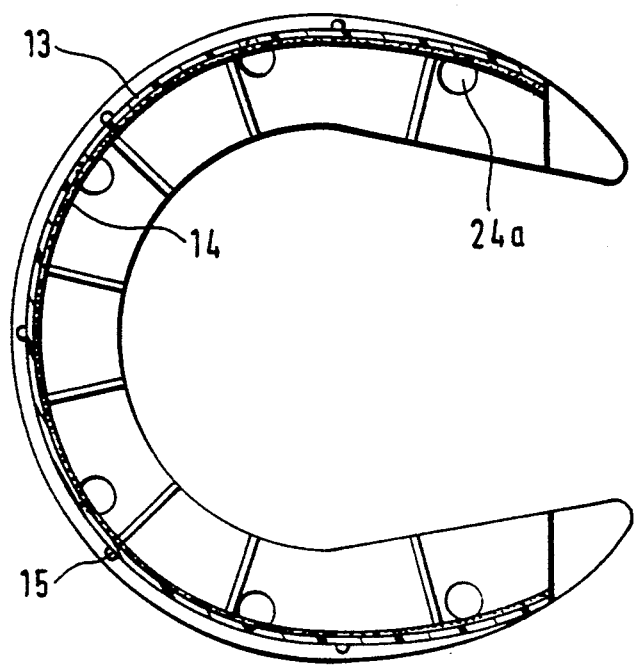
FIG. 3 is a sectional view taken along the line III—III of FIG. 1.

Referring now to the drawing and in particular to FIGS. 1-4, there is shown a hoof boot generally designated by reference numeral 30 and made in form of a molded part of plastic material. The hoof boot 30 has a flat base 10 of conventional horseshoe shape for attachment of a horseshoe 20 in a manner still to be described furtherbelow.

Integrally connected to the base 10 is a collar 13 which has a shape complementary to the side wall of a horsehoof (not shown). Along its inner surface, the collar 13 is lined with a textile covering 14 which is capable of absorbing an adhesive or glue. The hoof boot 30 is attached to the horsehoof by gluing the textile lining 14 of the collar 13 to the horsehoof.

Extending downwardly from the upper rim of the collar 13 are a plurality of thin strips 15 which serve as predetermined breaking points to allow a tearing or breaking of the wall of the collar 13. By dividing the collar 13 in several sections as defined by the strips 15, the collar 13 and thus the hoof boot 30 can be adjusted to the angle of the outer wall of the horsehoof so that a flat contact area is attained between the collar 13 and the horsehoof.

Figure 5:
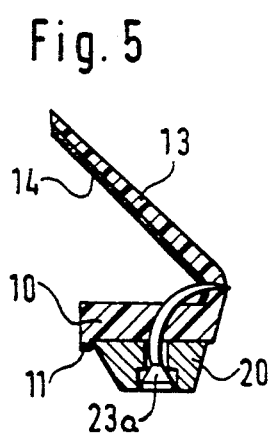
FIG. 5 is a sectional view taken along the line V—V in FIG. 4.
Figure 7:
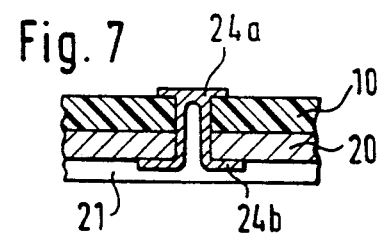
FIG. 7 is a sectional view taken along the line VII—VII in FIG. 6.
Figure 6:
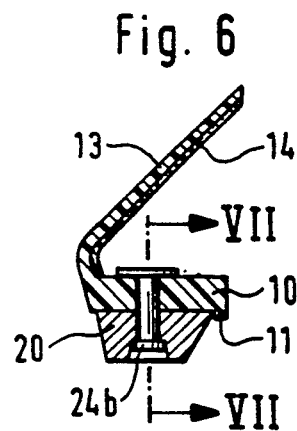
FIG. 6 is a sectional view taken along the line VI—VI in FIG. 4.

As shown in particular in FIGS. 5-7, the base 10 of the hoof boot has a flat upper surface and a flat lower surface, with the lower surface being provided with a circumferential projection 11 which extends downwardly to serve as boundary and bearing surface for the horseshoe 20. The width of the base 10 is suitably dimensioned to allow proper reception of nails, rivets or screws by which the horseshoe 20 is attached to the boot 30.

Figure 4:
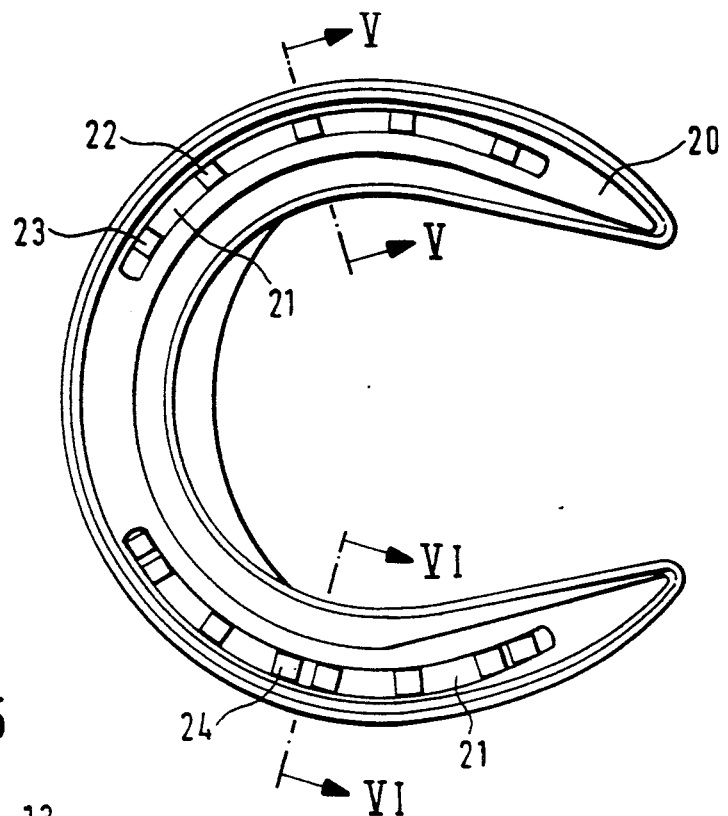
FIG. 4 is a bottom plan view of the horsehoof boot of FIG. 1.

As shown in particular in FIG. 4, the horseshoe 20 is provided with rectangular holes 22 which are spaced from each other in a crease or groove 21 and are in alignment with holes through the base 10. As indicated in the lower crease 21 of FIG. 4, and in particular in FIGS. 6 and 7, the attachment of the horseshoe 20 to the base 10 of boot 30 is attained by means of split rivets 24 which traverse with their shaft the aligned holes in the horseshoe (holes 22) and in the base 10, with the flat rivet heat 24a bearing upon the base 10. The split ends 24b of the rivet 24 are spread in the area of the crease 21 so as to hold the rivet 24 and thus the joined parts in place.

As indicated by the upper crease 21 in FIG. 4 and shown in particular in FIG. 5, the attachment of the horseshoe 20 to the base 10 can also be attained by means of conventional hoof nails 23, with their heads 23a being received in the crease 21 and their shafts 23b traversing the aligned holes of the horseshoe 20 and the base 10 and extending through the collar 13. As shown in FIGS. 5, the shaft 23b is arched, with its tip being bent downwards in the apex area of the collar 13 so as not to interfere with the hoof of the horse.

If need be, the horseshoe 20 can be detached from the hoof boot 30 by removing the nails 23, without requiring detachment of the plastic boot 30 itself.

Figure 8:
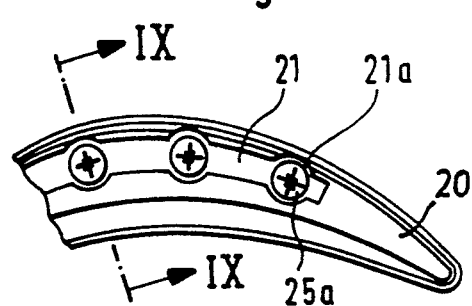
FIG. 8 is a fragmentary bottom plan view of a horsehoof boot with a horseshoe threadably engaged thereto.
Figure 9:
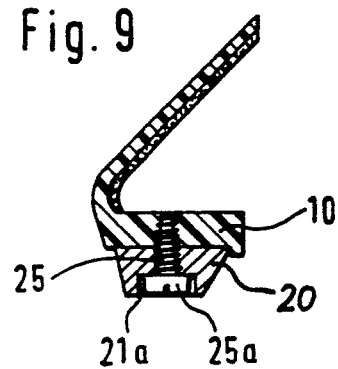
FIG. 9 is a sectional view taken along the line IX—IX in FIG. 8.

Turning now to FIGS. 8 and 9, there is shown the attachment of the horseshoe 20 to the base 10 by means of wood screws 25. The tapered thread of the wood screw 25 penetrates the base 10, with the head 25a being received in the crease 21 which includes holes 21a which are suitably widened through drilling for accommodating the head 25a of the wood screws 25.

While the invention has been illustrated and described as embodied in a horsehoof boot with horseshoe, it is not intended to be limited to the details shown since various modifications and structural changes may be made without departing in any way from the spirit of the present invention.

What is claimed as new and desired to be protected by Letters Patent is set forth in the appended claims.

I claim:

1. A horsehoof boot, comprising:
   a one-piece plastic part including a base having an upper surface and a continuous flat lower surface which is adapted for attachment of a horseshoe, and a collar connected to said base and provided with predetermined breaking points so as to be adaptable upon attachment to a horsehoof; and
   separate fastening elements detachably connecting said horseshoe to said base without requiring removal of said plastic part,
   said base and said horseshoe having enclosed and aligned holes for allowing passage of said fastening elements and secure attachment of the horseshoe to said base of said plastic part.

2. A horsehoof boot as defined in claim 1 wherein said collar has a rim and further includes thin strips extending downwardly from said rim for defining said predetermined breaking points.

3. A horsehoof boot as defined in claim 1 wherein said holes in said horseshoe are spaced in a crease, said fastening means including a split rivet having a flat head bearing upon said upper surface of said base and a rivet shaft traversing said aligned holes, with its split ends being spread in the area of said crease.

4. A horsehoof boot as defined in claim 1 wherein said holes in said horseshoe are spaced in a crease, said fastening means including a nail having a head received in said crease and a shaft traversing said aligned holes and being arched outwardly to penetrate an apex area of said base and said collar.

5. A horsehoof boot as defined in claim 1 wherein said holes in said horseshoe are spaced in a crease, said fastening means including a wood screw having a head received in a widening of said crease.

* * * * *